P. M. LINCOLN.
AUTOMOBILE STARTER.
APPLICATION FILED FEB. 26, 1913. RENEWED JUNE 30, 1916.
1,222,222.
Patented Apr. 10, 1917.
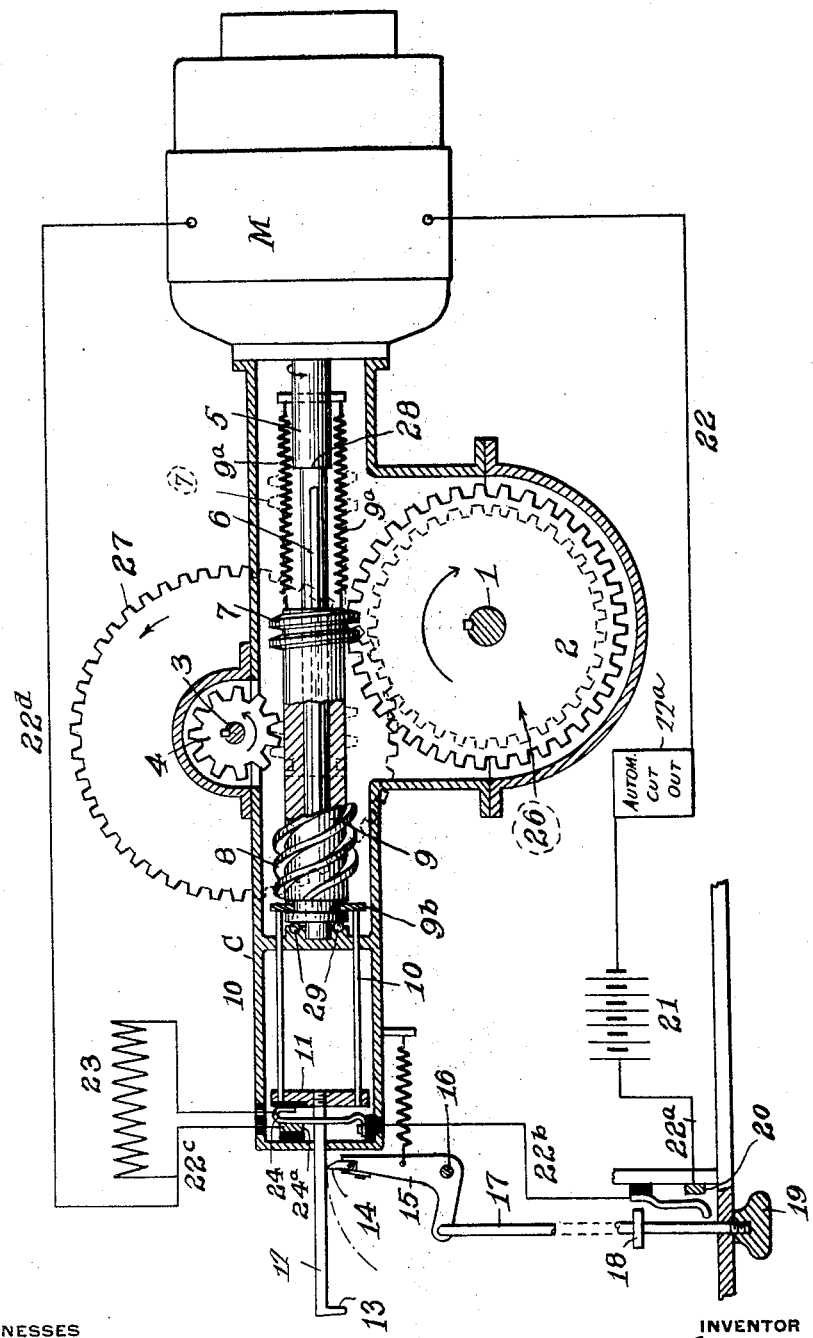
WITNESSES
INVENTOR

UNITED STATES PATENT OFFICE.

PAUL M. LINCOLN, OF PITTSBURGH, PENNSYLVANIA.

AUTOMOBILE-STARTER.

1,222,222.  Specification of Letters Patent.  Patented Apr. 10, 1917.

Application filed February 26, 1913, Serial No. 750,805. Renewed June 30, 1916. Serial No. 106,957.

*To all whom it may concern:*

Be it known that I, PAUL M. LINCOLN, a citizen of the United States, residing at Pittsburgh, Pennsylvania, have invented certain new and useful Improvements in Automobile-Starters, of which the following is a specification.

My invention relates generally to means for starting an explosion motor by electric devices and charging batteries for operating the starter; it is particularly adapted to automobiles supplied with explosion engines and storage batteries, though it is applicable to many other uses. In the accompanying drawing I have shown in diagram and cross-section a convenient embodiment of my invention as applied to an automobile.

In my co-pending application No. 745,824, filed Feb. 3, 1913, I have shown a device for turning the explosion engine shaft by means of an electric motor, with a particular gearing by which the two motor shafts are disconnected automatically when the engine shaft begins to move by its own power.

I now propose to secure a further improvement which involves the use of a similar gearing to drive the motor in reverse in order to form a generator and recharge the storage battery by which the motor is operated. This involves a certain arrangement of gearing mechanism new in itself, without regard to its particular application.

Thus in the accompanying drawing if we suppose the shaft 1 shown in cross-section to be the shaft of an explosion motor, which may conveniently lie longitudinally with the vehicle, we may set the shaft of the dynamo-electric machine M at right angles to it for convenience. The shaft 1 carries a gear-wheel 2, which is arranged to mesh with worm 7, provided on the one end of the integral sleeve 9, which slides on the horizontal shaft 5, and is provided with a spline 6 so that it must turn with the shaft. As described in my said prior application, the sleeve 9 is normally held by retractile springs 9$^a$ in the position as shown by dotted lines, toward the right; and it is moved toward the left to engage gears 7 and 2 by means of a collar 9$^b$, which rides in a groove at the left end of sleeve 9, and by means of links 10, cross-head 11, and rod 12, is drawn over toward the right by any convenient means. As here shown, the rod 12 is provided with a catch 13, which is engaged by a trip-dog 14, on bell-crank lever 15, pivoted at 16, and operated by a link 17 and handle 19, which may be conveniently arranged at any desired place in the front of the vehicle.

It will be understood that a pull on the handle 19 to start the operation, will first cause the lug 18 on the link 17 to make a contact 20 which closes the circuit of the battery 21, through the leads 22, 22$^a$, 22$^b$, resistance 23, 22$^c$, 22$^d$ and the motor M. The proportions are such that at the same time a movement of the cross-head 11 toward the left brings the worm 7 in mesh with the gear 2. The revolution of the motor shaft 5, which will now take place slowly by reason of the presence of resistance 23 in the circuit, will cause the worm 7 and sleeve 9 to move idly to the left, the gear 2 being stationary, and when the sleeve 9 abuts against the ball bearings 29, the cross-head 11 will have just reached a position to close the spring switch 24 on contact 24$^a$, by which the resistance 23 will be cut out and the full current thrown on the motor. The sleeve 9 being incapable of moving farther to the left will drive the gear 2 in the direction indicated by the arrow until an explosion occurs in the engine cylinder, whereupon the shaft 1 and gear 2 becoming active will automatically throw the sleeve 9 back to the right and in normal position. It will be noted the lug 13 on the bar 12 will escape the spring dog 14 of the operating bell-crank lever, by reason of the radius of movement of the latter carrying it outside the path of the lug 13.

It should be noted that the operation of the motor and worm 7 on the gear 2 maintains the worm 7 in its proper working position, and that as soon as it ceases to operate positively it is automatically thrown out of gear, by the engine shaft becoming active.

The engine shaft 1 is also provided with any convenient form of gear 26, shown in this case in dotted lines behind the gear 2, and this meshes with another gear 27, fixedly mounted upon the arbor shaft 3, which also carries fixed thereon a small screw gear 4 arranged to mesh with the alternate worm gear 8 at the left end of sleeve 9. When the sleeve 9 moves to the right or normal position, against abutment 28 on shaft 5, as shown in dotted lines, it engages the gear 4 and gear 8 and consequently the motor is now positively driven by the power from the engine shaft 1, and becomes a generator which may recharge the storage battery 21.

Of course there will be provided any convenient and known form of automatic cut out 22ª by which the circuit of the dynamo-electric machine may be broken when the speed is too slow.

By the above means I provide a convenient electric motor which can be engaged and drive the engine shaft to start the engine, which thereupon automatically disengages itself from the position of driving the engine shaft and at the same time changes the motor into a generator to immediately recharge the battery which has been drawn upon for operating the motor. It will be noted that in either position of the mechanism each pair of gears is so related that the performance of its proper function maintains it in the proper operating position, and that the change of function automatically disengages the gearing. This avoids any uncertainty in action, effects great economy of space and makes the device perfectly simple and reliable. The possibility of arranging the gearing for any speed required in either function without interfering with the other function is also important. It will be understood of course that I am not limited to spiral or worm gearing at 7 and 8, but may use bevel gears or any other gears, though the spiral gear has the great advantage that it automatically maintains its own proper position so long as it is performing its proper function in driving in either of the ways described, and is automatically disengaged when the function is reversed.

Other advantages will readily occur to those familiar with the art.

Having thus described my invention and illustrated its use, what I claim is:

1. The combination with an engine driven shaft and a motor and motor shaft, of devices adapted to drive the engine shaft by means of the motor shaft and devices to drive the motor shaft by means of the engine shaft when it becomes active, such devices including a shiftable gear sleeve having engagement in a plurality of positions with a plurality of gears connected to the engine shaft.

2. A gearing device for connecting an electric machine to an engine shaft so as to alternately drive and be driven thereby, comprising an engine shaft, two gears connected thereto, the motor shaft and a sliding sleeve on the motor shaft provided with two worms adapted to alternately engage said two gears connected to the engine shaft.

3. Gearing for connecting an engine shaft and a motor shaft for alternately driving the engine shaft by the motor and the motor by the engine shaft, comprising the engine shaft, a motor shaft having a splined sliding sleeve thereon, carrying a plurality of worms and operative gearing connected to the engine shaft and engaging said worms in alternation, substantially as described.

4. The combination with the shaft of an explosion engine, and the shaft of a dynamo-electric machine, of a train of gears connecting the engine shaft so as to be driven by the motor shaft, and a second train of gears connecting the engine shaft so as to drive the motor shaft, such gearing including, as a common element, a sliding gear sleeve splined on the motor shaft, substantially as described.

5. The combination with an engine shaft, of two gears fixed thereon, a dynamo-electric machine shaft, a sleeve splined thereon having a worm engaging one of the engine shaft gears and another worm, a supplementary gear connecting said second worm with the second gear on the engine shaft upon shifting of the sliding sleeve, and means to simultaneously shift the sleeve to start the engine shaft by means of the electric machine but automatically releasing and shifting the gearing upon active motion of the engine shaft.

6. A device for starting an explosive engine by an electric machine and then positively driving the electric machine as a generator by means of an engine, comprising the motor shaft, a shifting sleeve splined thereon, and having two separated gears adapted respectively for driving and being driven, the engine shaft, and connecting gears engaging said sleeve in each shifted position, and means for shifting the position of the sleeve.

In testimony whereof I have hereunto signed my name in the presence of the two subscribed witnesses.

PAUL M. LINCOLN.

Witnesses:
F. W. H. Clay,
Fred'k. Staub.

Copies of this patent may be obtained for five cents each, by addressing the "Commissioner of Patents, Washington, D. C."